United States Patent
Kirn et al.

(10) Patent No.: US 7,631,259 B2
(45) Date of Patent: Dec. 8, 2009

(54) SYSTEM AND METHOD FOR MEDIA-ENABLED MESSAGING HAVING PUBLISH-AND-SEND FEATURE

(75) Inventors: Kevin Neil Kirn, Seattle, WA (US); Steven Gary Frank, Sammamish, WA (US); Mark A. Nikiel, Redmond, WA (US); Tanuja Joshi, Redmond, WA (US); Brian Robert Cody, Seattle, WA (US); Kurt Alan Weber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 11/534,562

(22) Filed: Sep. 22, 2006

(65) Prior Publication Data

US 2007/0121819 A1 May 31, 2007

Related U.S. Application Data

(63) Continuation of application No. 10/728,086, filed on Dec. 5, 2003, now abandoned.

(51) Int. Cl.
 *G06F 3/00* (2006.01)
(52) U.S. Cl. .................................................. 715/716
(58) Field of Classification Search ......... 345/629–641; 715/752
 See application file for complete search history.

(56) References Cited

U.S. PATENT DOCUMENTS

| | | | | |
|---|---|---|---|---|
| 5,557,790 | A * | 9/1996 | Bingham et al. | 707/101 |
| 6,314,517 | B1 * | 11/2001 | Moses et al. | 713/156 |
| 6,477,513 | B1 * | 11/2002 | Walker et al. | 705/76 |
| 7,092,953 | B1 * | 8/2006 | Haynes | 707/100 |
| 7,136,945 | B2 * | 11/2006 | Gibbs et al. | 710/62 |
| 7,159,192 | B2 * | 1/2007 | Dobronsky | 715/835 |
| 2001/0002485 | A1 * | 5/2001 | Bisbee et al. | 713/167 |
| 2002/0144117 | A1 * | 10/2002 | Faigle | 713/169 |
| 2002/0180788 | A1 * | 12/2002 | Wu | 345/752 |
| 2004/0260786 | A1 * | 12/2004 | Barile | 709/217 |
| 2005/0028006 | A1 * | 2/2005 | Leser et al. | 713/200 |
| 2005/0177420 | A1 * | 8/2005 | Tanahashi | 705/14 |
| 2005/0210393 | A1 * | 9/2005 | Maeng | 715/751 |
| 2005/0273514 | A1 * | 12/2005 | Milkey et al. | 709/232 |

(Continued)

*Primary Examiner*—Kee M Tung
*Assistant Examiner*—David H Chu
(74) *Attorney, Agent, or Firm*—Shook, Hardy & Bacon L.L.P.

(57) ABSTRACT

A system and related techniques manage the adding of digital images or other media to email messages using a comparatively straightforward insert-and-send scheme. A user may choose to insert or embed comparatively low-resolution versions of images or other media automatically published to a media server into an email message. The recipient of that media-enabled message may receive and view the email text message along with the low-resolution images in typical fashion using an email or other client. The recipient may choose to view one or more of the embedded images in greater resolution by linking or activating those images, for instance by moving a cursor and clicking into the selected image or other object. Activating the image or other media object from within the email pane may seamlessly transport the user to the media server's Web page to view a larger-resolution version of that image, for instance using a media player. Video, audio and other media may likewise be inserted into messages. The sender may therefore share a variety of images, audio, video or other media with selected recipients without loading the recipient's email or other client with increased download times or storage requirements.

19 Claims, 5 Drawing Sheets

U.S. PATENT DOCUMENTS

2006/0021065 A1* 1/2006 Kamperman et al. .......... 726/28
2006/0200661 A1* 9/2006 Doonan et al. .............. 713/156
2007/0033533 A1* 2/2007 Sull ........................... 715/752

* cited by examiner

SYSTEM AND METHOD FOR MEDIA-ENABLED MESSAGING HAVING PUBLISH-AND-SEND FEATURE

CROSS-REFERENCE TO RELATED APPLICATION

This application is a continuation of and claims the benefit of priority to U.S. patent application Ser. No. 10/728,086, filed on Dec. 5, 2003.

STATEMENT REGARDING FEDERALLY SPONSORED RESEARCH OR DEVELOPMENT

Not applicable

FIELD OF THE INVENTION

The invention relates to the field of communications, and more particularly to a platform and techniques for generating email or other messages which seamlessly incorporate linkable high-resolution images or other media for selective viewing by the recipient.

BACKGROUND OF THE INVENTION

The proliferation of digital cameras, cellular phones equipped with digital cameras, video cameras and other imaging devices has led to a corresponding interest on the part of consumers in sharing their photographs and other media. While dedicated Web services exist to accept and serve consumers' uploaded camera shots, the necessary steps to prepare, upload and share that media may be inconvenient to some users.

Many users on the other hand may prefer or revert to sharing their digital photographs or other media by way of email, choosing to embed or attach the JPG or other digital photo files directly into email messages to friends and others. However, using ordinary email services as a vehicle to exchange digital photographs, video clips, audio clips or other media has significant drawbacks. For one, high-resolution digital photographs can reach several megabytes in size. Attempting to transmit files of that or greater size via an email service may bog the sender's email client down, or clog the recipient's inbox with content which takes a significant time to open. In cases large email attachments may not transmit at all.

Users may instead generate reduced resolution versions of photographs and other media to help alleviate those transmission and storage issues. Some email clients may likewise permit a user to embed or attach reduced resolution versions of images to outgoing email messages. Those various smaller versions may include for example thumbnail or Web-ready images, on the order of 100×100 pixels or more or less. While this permits the recipient to view a representation of the original image, that representation may be too low-resolution to permit printing or other manipulation of the image. Other problems and disadvantages exist in current media sharing technology.

SUMMARY OF THE INVENTION

The invention overcoming these and other problems in the art relates in one regard to a system and method for media-enabled messaging having a publish-and-send feature, in which a sender may insert digital photographs, video clips, audio files or samples or other media into an email message or other message object. The images may be automatically embedded or attached as a linkable media object, for instance in the form of a reduced-size or resolution version of the images which the user desires to share. A composition interface may permit the user to lay out those images and automatically publish full-resolution or otherwise enhanced representations to a media server or other resource, for instance located at a Web site. When the email or other recipient receives the message, they may view the comparatively reduced-resolution linkable media objects embedded in the message, and select one or more of those objects to view in more detail. Activating the linkable media object may seamlessly invoke a media player or other client application to transport the recipient to the associated Web site or other delivery resource. The recipient may then view, listen, download and store or otherwise manipulate the enhanced representation of the photographs or other media. Both the sender and the recipient of the media-enabled message may therefore manipulate the inserted photographs or other media transparently, without having to carry out other steps beyond typical email operation.

DETAILED DESCRIPTION OF EMBODIMENTS

Figure 1:
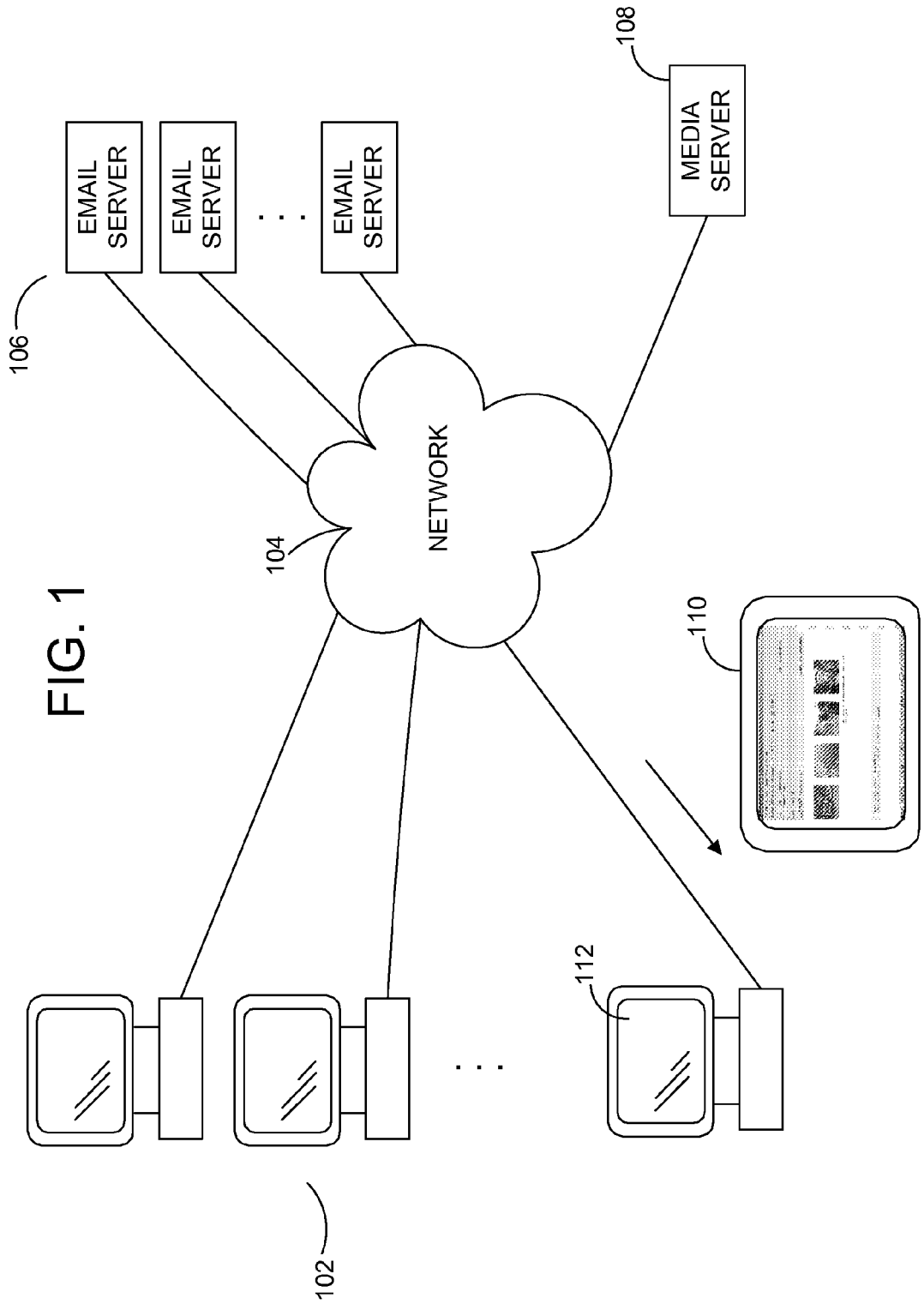
FIG. 1 illustrates a network in which a media-enabled message platform may operate, according to embodiments of the invention.

FIG. 1 illustrates an overall network architecture in which a system and method for media-enabled messaging may operate, according to an embodiment of the invention. As illustrated in that figure one or more users in a set of users 102 may use personal computers, workstations, personal digital assistants, network-enabled cellular telephones or other clients or devices to communicate with each other via a network 104. Network 104 may be, include or interface to, for example, the Internet, an intranet, a local area network (LAN) or other local or remote network. Those users may manipulate a user interface 112, such as a graphical user interface, command line interface, voice-activated or other interface to perform messaging functions according to the invention.

Users may more particularly generate, publish, store and exchange one or more media-enabled message 110 using the media-enabled messaging capabilities of embodiments of the invention. The media-enabled message 110 may in embodiments be or include an email message transmitted by an email client, but it will be appreciated that other types and formats of messaging and messages may be employed. According to the invention in one regard, a user in the set of users 102 may receive a media-enabled message 110 via a set of email servers 106, which set may include one or more post office protocol (POP) servers, Internet message access protocol (IMAP) or others. As illustrated, the recipient of the media-enabled message 110 may receive and view the message and access enhanced content associated with that message via a media server 108 and other resources, as described herein.

Figure 2:
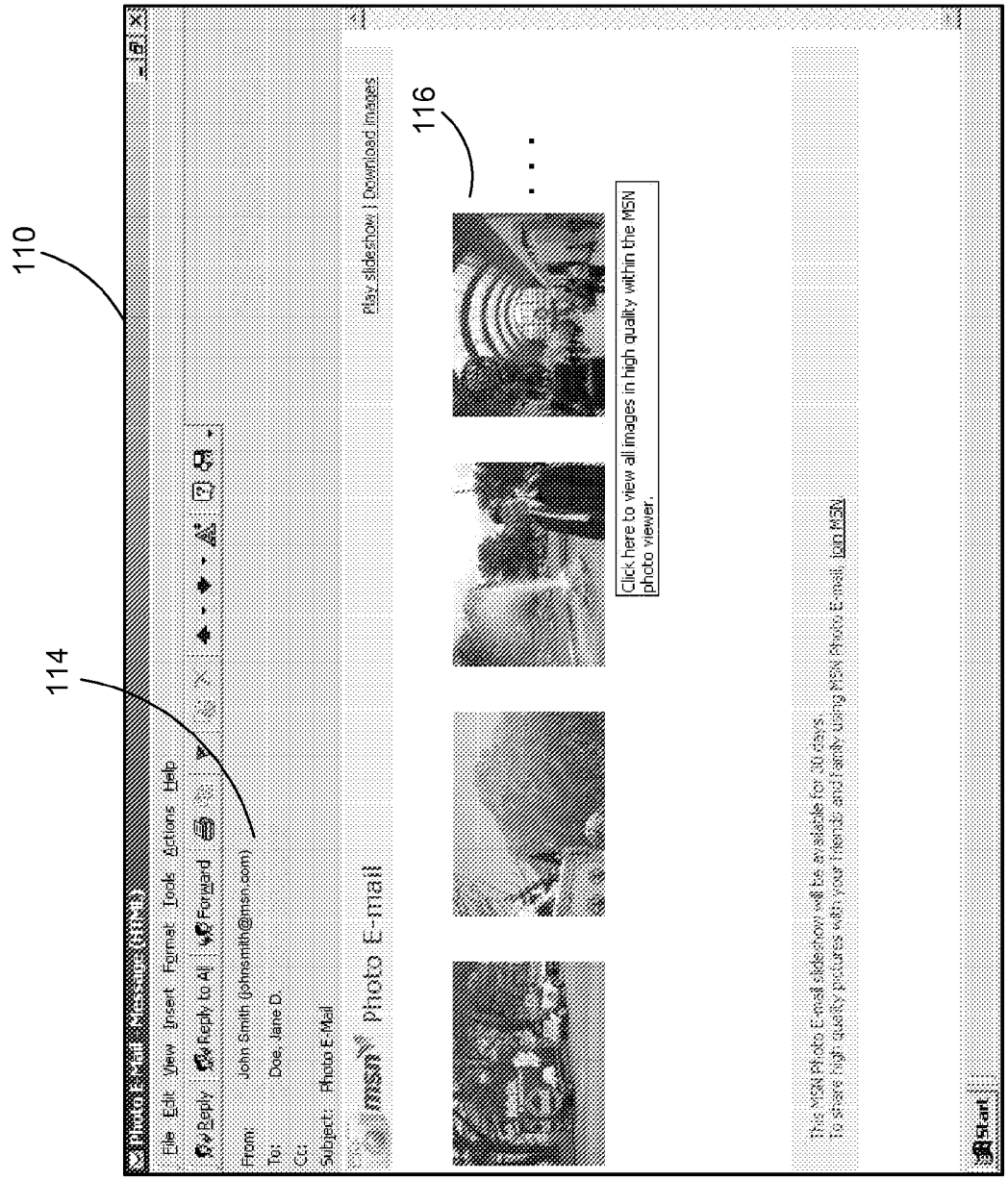
FIG. 2 illustrates a media-enabled message, according to an embodiment of the invention.

As more particularly illustrated in FIG. 2, the media-enabled message 110 may contain various constituent parts including message header 114, which may be or include email address, date, time, subject and other data, as well as a set of linkable media objects 116. As illustrated, the set of linkable media objects 116 may be or include a set of comparatively compact or modest-resolution graphical images. Those images may be or include, for example, digital images downloaded by the user from a digital camera, camera-equipped cellular phone, or other types of images, stored for example in Joint Photographic Experts Group (.JPG) or other formats. In embodiments, linkable media objects 116 may likewise be or include other types or mixed types of media, such as video clips, such as those in Windows™ AVI format, or audio samples or files, such as those in MP3 (MPEG Audio) or other formats. Other media types, formats, files and sources are possible.

Figure 3:
FIG. 3 illustrates the presentation of media objects from a media-enabled message, according to embodiments of the invention.

As illustrated in FIG. 2, any one or more or all of the linkable media objects 116 may be selectable or activatable by the recipient of the media-enabled message 110, such as by operating a mouse cursor or other element of user interface 112. Clicking or otherwise linking or activating any one or more of the linkable media objects 116 may automatically and transparently invoke a media player 118, such as the player illustrated in FIG. 3. As illustrated, selecting one (mountain) image among the set of linkable media objects 116 shown in FIG. 2 may initiate a browser or other tool as shown in FIG. 3, in which or in conjunction with which a slideshow-type or other media player 118 may execute or operate, to present an enhanced representation of the selected media object. As illustrated, that enhanced representation in the case of an image may be or include a higher-resolution version of the image. That enhanced representation may be automatically downloaded or accessed from media server 108 upon activating the selected one of the linkable media objects 116. The user browsing their email and choosing to view selected media objects from their email inbox or other messaging service may therefore be given an impression of continuousness within their email activity, insofar as no separate action by the user to retrieve and view or play the enhanced content is required. It may be noted that in embodiments, the media player 118 or other media presentation tool may present the enhanced representation of the one or more selected linkable media objects 116 from within the running email client or other tool itself, rather than opening a new browser or other window. Other interfaces and types of presentation are possible.

Figure 4:
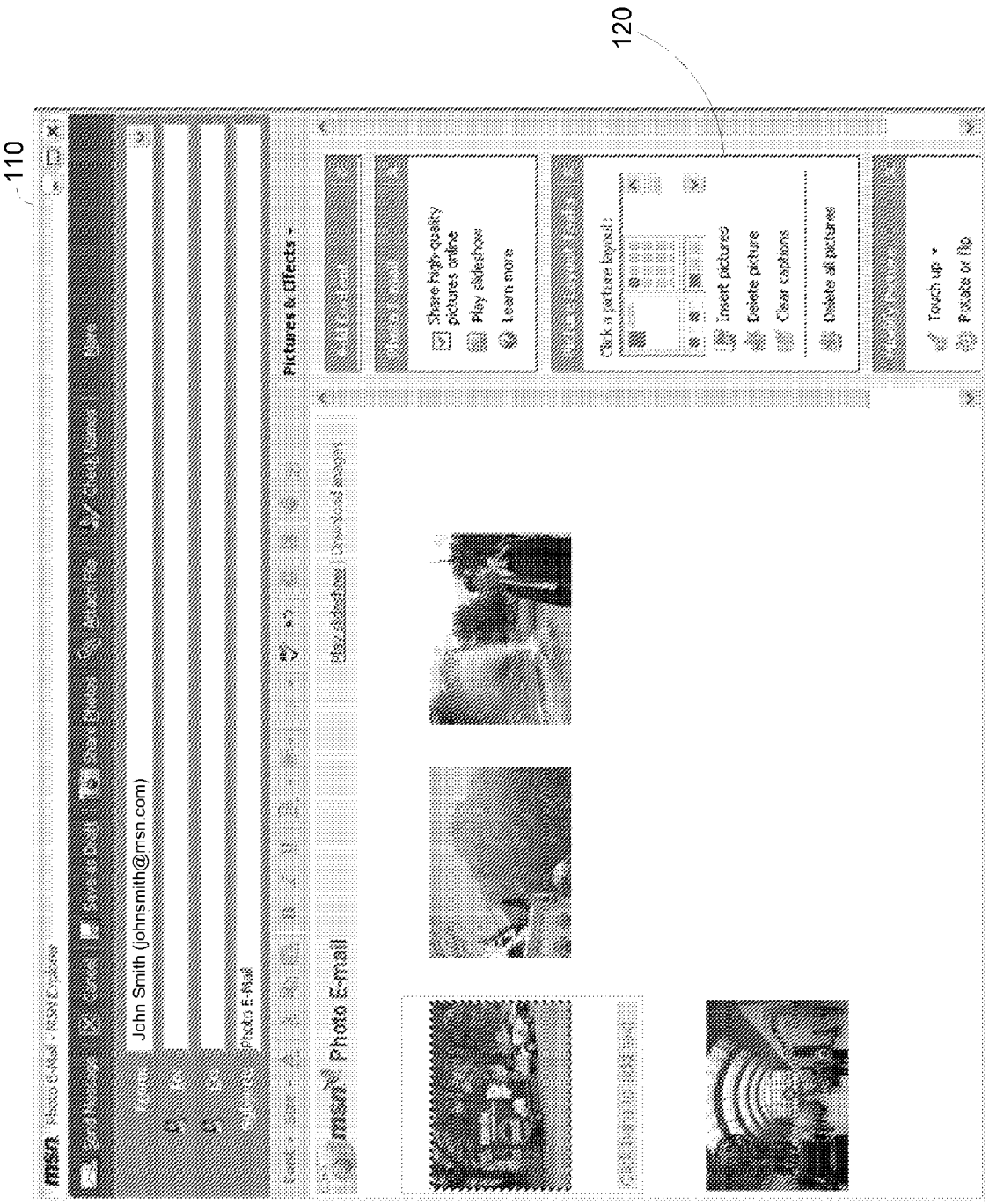
FIG. 4 illustrates the composition of a media-enabled message, according to an embodiment of the invention.

In terms of the composition of the media-enabled message 110, as illustrated in FIG. 4 the user who is selecting and arranging media content for the message may be presented with a composition interface 120, for instance within or in conjunction with an email client or other messaging tool. As illustrated the composition interface may include or present a grouping of drop-down image selection, preview, editing, layout, captioning and other tools and utilities to permit the sending user to embed images and other media in media-enabled message 110 according to their preferences and selected styles.

When operated in conjunction with an email client such as the Microsoft Network (MSN) email client, Outlook™ or Outlook Express™ for example, the user may click different options on composition interface 120 to insert a group of digital images, such as uploaded camera or other files. When the user has inserted images and clicks the "send" option, the media-enabled message 110 may be transferred to an email Outbox, which transfer may take a brief amount of time. Upon arriving in the email Outbox, an upload of the full-resolution or otherwise enhanced images corresponding to the inserted linkable media objects 116 may be automatically initiated to the media server 108, or other repository or other destination. If the upload process, for instance via Internet connection, fails or stalls unexpectedly, in embodiments such exceptions may be trapped and uploading may be automatically resumed without user intervention.

In embodiments the media-enabled message 110 arriving in the email Outbox may be placed into a separate queue from other, non-media email so that transfers may continue in parallel, and not slow down or affect the transmission of those text-based or other messages. It may be noted that in embodiments, if a hard crash of the media server 108, connections to network 104 or other resources occurs which prevents successful transfer of the high-resolution images, the user may be alerted with a message, for instance via pop box or return email, that the upload did not complete. In those cases the sender of the media-enabled message 110 may for example be given the option of trying the upload again later, or transmitting a version of media-enabled message 110 which limits the recipient to viewing the lower-resolution versions of the linkable media objects 116 contained in the message itself. In further embodiments the composition interface 120 may be used to compose email messages or other types of media-enabled message 110 while the sending user is offline, with the image or other files stored to go to the email Outbox upon connection to the network 104 or other times. Other types of user notification and traffic management are possible.

In embodiments, the linkable media objects 116 contained in the media-enabled message 110 may contain digital signatures or fingerprints for various purposes including digital rights management, storage and distribution control. For example, the linkable media objects 116 may each contain a fingerprint which may include a unique identifier for the encoded image, for instance prevent duplicate storage of the image or other object uploaded to media server 108. Other data, such as the upload date or other information, may also be encoded. This may permit the owner or operator of the media server 108, such as an Internet service provider or other, to manage the storage of the images and other content on databases and other resources. In embodiments, each of the linkable media objects 116 may be given a predetermined life span, such as 30 days or other periods of time to conserve and manage storage resources. In other embodiments, the digital signatures incorporated in the linkable media objects 116 may control types and manner of distribution, for instance to permit or not permit editing of images, or permit or not permit reproduction of encoded music or other media. Other types of security and control are possible.

Figure 5:
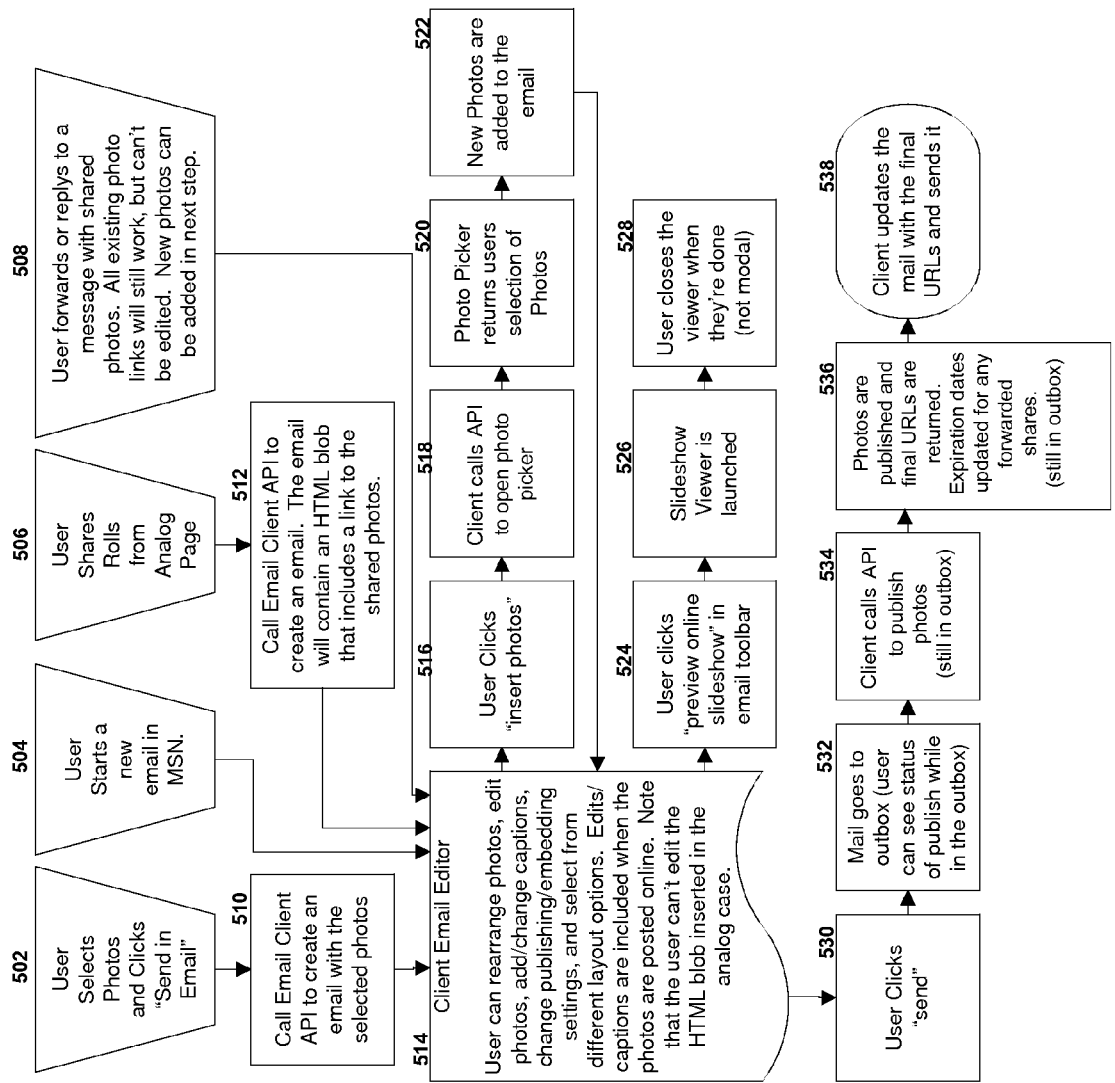
FIG. 5 illustrates a flowchart of overall message processing, according to an embodiment of the invention.

Overall message processing according to an embodiment of the invention is illustrated in FIG. 5. In step 502, a user may select a "Photos" or other media option on composition interface 120 or other interface, and click on a "Send in Email" option. Processing may then proceed to step 510. In step 510, an email client application programming interface (API) may be called to generate an email as the media-enabled message 110. That message may contain selected digital images or photographs as the one or more linkable media objects 116. Processing may then proceed to step 514.

Alternatively in step 504 a user may initiate the composition of a new email message or other message format, for instance using an email client or other application. Processing may then proceed to step 514.

Alternatively in step 506 a user may share rolls of developed images or other media from an analog film-development page or other Web or other source. Processing may then proceed to step 512. In step 512, an email client API or other application programming or other interface may be invoked to generate a new email or other media-enabled message 110, which in the case of content generated from an analog film-development Web page or other source may contain HTML code including a link to shared photos or other media as linkable media objects 116. Processing may then proceed to step 514.

Alternatively in step 508 a user may forward, reply to or otherwise respond to an existing media-enabled message 110 containing one or more linkable media objects 116, for instance to add additional media objects to the media-enabled message 110. Processing may then proceed to step 514.

In step 514, processing may proceed to execute an email client or other messaging application or tool, for instance to compose, edit, add captions or otherwise arrange the layout and content of one or more linkable media objects 116 in media-enabled message 110.

In step 516, a user may click or activate an option to "Insert Photos" in composition interface 120 or other interface. In step 518, an email client or other application may call an associated API to initiate a photo picker or other tool. In step 520, the photo picker or other tool may return the user's selection of photos, video clips, audio samples or other media. In step 522, the new photos or other linkable media objects 116 may be added to the email or other media-enabled message 110. Processing may then return to the editor processing of step 514.

In step 524, a user may click or activate a "preview online slideshow" in the composition interface 120. In step 526, a slideshow viewer or other media player 118 or other tool may be activated. In step 528, a user may close the slideshow viewer or other media player 118 or other tool.

In step 530, after editing activity in step 514 or other steps a user may click or activate a "send" option. Activating the "send" option may according to the invention in one regard appear no different to the sender than operating or sending a non-media enabled email message, since publishing activity is automatically invoked. In step 532, the email or other media-enabled message 110 may be transmitted to an outbox, during which time the user may in embodiments be presented with the status of the publishing of the media-enabled message 110 to media server 108 or other resource. In step 534, the email or other client may call an associated API to publish the digital images or photographs or other media, during which time the media-enabled message 110 may remain in an outbox. In step 536, a digital photo or other tool may publish the photographs or other media as the linkable media objects 116 to media server 108, and may return a final URL specifying a location of the linkable media objects 116 accessible via media-enabled message 110. The digital photo or other tool may also update any expiration dates contained in or associated with linkable media objects 116, including for any forwarded or shared content. During this time, the media-enabled message 110 may remain in an email outbox or other queue or holding place.

In step 538, the email client or other messaging client or tool may update the media-enabled message 110 with the final URL or URLs for the linkable media objects 116, and transmit the media-enabled message 110 to the recipient. In the case of an email client, the media-enabled message 110 or a representation of that message may then be placed in a "sent" box or other messaging box or folder.

The foregoing description of the invention is illustrative, and modifications in configuration and implementation will occur to persons skilled in the art. For instance, while the invention has generally been described in terms of one or more email messages which embed low-resolution or thumbnail representations of stored images, in embodiments other media, such as audio clips, streamed video or other types or combinations of types of media may be incorporated.

Similarly, while the invention has in embodiments been described as generating email messages which embed those media objects, in embodiments other types or formats of messages or messaging such as online chat forums, Web logs or others, may embed or transmit media according to the invention. Further, while the invention has been described as accessing a single media server, in implementations multiple servers may be accessed and each serve one or more types of files or media. In embodiments distributed media servers if used may operate on a peer-to-peer rather than client/server basis. Other hardware, software or other resources described as singular may in embodiments be distributed, and similarly in embodiments resources described as distributed may be combined. The scope of the invention is accordingly intended to be limited only by the following claims.

We claim:

1. A system for selectively presenting media embedded in a message, comprising:
    an input interface to receive a media-enabled message, wherein the media-enabled message includes an image of a media object that is viewable by a recipient of the media-enabled message and a digital signature that is associated with the image, wherein the digital signature includes a unique identifier and a time stamp, and wherein the image is linked to the media object and is at least a partial representation of the media object and is a lower resolution than the media object;
    a messaging client, communicating with the input interface, the messaging client presenting the media-enabled message to a user and receiving a selection of the image from the user;
    a media server, communicating with the messaging client, the media server:
        (1) receiving one or more media objects from one or more messaging clients,
        (2) storing the one or more media objects including the media object,
        (3) deactivating a link to the media object after a threshold period of time, wherein the time stamp is used to determine when the threshold period of time is reached, and
        (4) preventing the duplicate storage of more than one copy of a particular media object on the media server using the digital signature associated with the particular media object as a unique identifier; and
    a media player, communicating with the messaging client and the media server, the media player, upon receiving the selection of the image, downloading an enhanced representation of the media object from the media server and presenting the enhanced representation of the media object to the user, wherein the enhanced representation is a higher-resolution representation of the media object than the image.

2. A system according to claim 1, wherein the messaging client comprises an email client.

3. A system according to claim 1, wherein the media object comprises at least one of a graphical image, an audio stream and a video stream.

4. A system according to claim 1, wherein the media player comprises at least one of a slide show player, an audio player and a video player.

5. A system according to claim 1, wherein the selection of the image activates a link to the media object.

6. A system according to claim 1, wherein the media player is integrated with the messaging client.

7. A system according to claim 1, wherein the media player is separate from the messaging client.

8. A method for adding new media objects to a response to media embedded in a message, comprising:
- receiving, at a client device, a media-enabled message that includes a linkable media object, wherein the linkable media object is associated with a media object stored on a media server, has a link to the media object, and has a time stamp wherein the time stamp is used to deactivate the link to the media object after a threshold period of time, and wherein, when first added to the linkable media object, the time stamp indicates a date on which the media-enabled message was generated;
- presenting the media-enabled message to a user;
- receiving an instruction from the user to generate a response to the media-enabled message;
- displaying the response to the user, wherein the response includes the linkable media object;
- receiving a new media object to add to the draft response;
- transmitting the new media object to the media server;
- editing the response to include a new linkable media object that includes a new link to the new media object and a new time stamp indicating the present date;
- associating the new time stamp with the linkable media object received in the media-enabled message, thereby extending an activation period of the linkable media object; and
- communicating the response, including the linkable media object and the new linkable media object, to at least one intended recipient.

9. A method according to claim 8, wherein the response is one of a reply to the media-enabled message and a forward of the media-enabled message.

10. A method according to claim 8, further comprising communicating with at least one media server to retrieve an enhanced-resolution representation of the linkable media object.

11. The method of claim 8, wherein the digital signature includes instructions for digital rights managements that are used to prevent a recipient of the media-enabled message from duplicating the media object.

12. The method of claim 8, wherein the unique identifier in the digital signature is used to prevent storage of duplicate media objects in the media server.

13. A method for generating a media-enabled message, comprising:
- receiving, at a client device, a request from a user to forward a media-enabled message, wherein the media-enabled message includes a linkable media object that includes a link to a media object stored on a media server and a digital signature that includes a unique identifier for the media object and a time stamp for the linkable media object, wherein the time stamp is used to deactivate the linkable media object after a threshold period of time, and wherein the time stamp indicates a date on which the media-enabled message is generated;
- updating the time stamp associated with the media object to indicate the present date, thereby resetting a period of time during which the link to the media object is active; and
- forwarding the media enabled message to a recipient designated by the user.

14. A system according to claim 13 wherein the uploader module communicates the media-enabled message to an email client.

15. A method according to claim 13, wherein the media-enabled message is separately queued from non-media-enabled messages in an email client.

16. The system of claim 13, wherein the time stamp is used by the media server to delete the media object after a threshold period of time.

17. The system of claim 13, wherein the digital signature includes instructions for digital fights managements that are used to prevent a recipient of the media-enabled message from duplicating the media object.

18. The system of claim 13, wherein the unique identifier in the digital signature is used to prevent storage of duplicate media objects in the media server.

19. The system of claim 13, wherein the digital signature includes a time stamp that is used by the media server to deactivate a link to the media object after a threshold period of time.

* * * * *

UNITED STATES PATENT AND TRADEMARK OFFICE
CERTIFICATE OF CORRECTION

PATENT NO. : 7,631,259 B2  Page 1 of 1
APPLICATION NO. : 11/534562
DATED : December 8, 2009
INVENTOR(S) : Kirn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 261 days.

Signed and Sealed this

Second Day of November, 2010

David J. Kappos
*Director of the United States Patent and Trademark Office*